United States Patent [19]

Sathyakumar

[11] 4,263,002
[45] Apr. 21, 1981

[54] DIFFERENTIAL DOPPLER TECHNIQUE FOR ON-AXIS BACKSCATTER MEASUREMENTS

[75] Inventor: Rajabushanan Sathyakumar, St. Paul, Minn.

[73] Assignee: TSI Incorporated, St. Paul, Minn.

[21] Appl. No.: 31,956

[22] Filed: Apr. 20, 1979

[51] Int. Cl.³ .................................................. G01B 9/02
[52] U.S. Cl. .................................. 356/349; 356/28.5; 356/342
[58] Field of Search ....................... 356/28.5, 342, 349

[56] References Cited

U.S. PATENT DOCUMENTS

| | | | |
|---|---|---|---|
| 3,532,427 | 10/1970 | Paine | 356/28.5 |
| 3,547,540 | 12/1970 | Shigemoto | 356/28.5 |
| 3,548,655 | 12/1970 | Rudd | 73/194 |
| 3,584,956 | 6/1971 | Hines et al. | 356/28.5 |
| 3,723,004 | 3/1973 | Brayton | 356/28.5 |
| 3,744,910 | 7/1973 | van Deelen . | |
| 3,753,616 | 8/1973 | Goethert | 356/28.5 |
| 3,795,447 | 3/1974 | Welch et al. | 356/28.5 |
| 3,825,346 | 7/1974 | Rizzo . | |
| 3,832,059 | 8/1974 | Iten | 356/28.5 |
| 3,866,055 | 2/1975 | Pike | 250/564 |
| 3,895,872 | 7/1975 | Dandliker et al. | 356/28.5 |
| 3,915,572 | 10/1975 | Orloff . | |
| 3,941,477 | 3/1976 | Schodl | 356/28.5 |
| 3,966,324 | 6/1976 | Iten . | |
| 4,036,557 | 7/1977 | Christensen | 356/28.5 |

Primary Examiner—Edward S. Bauer
Assistant Examiner—Matthew W. Koren
Attorney, Agent, or Firm—Burd, Bertz & Gutenkauf

[57] ABSTRACT

A diagnostic apparatus and method for measuring motion of flowing solid and fluid particles that utilizes a differential doppler system and makes measurements parallel to the optical axis of the system. The system includes a laser generating a light beam directed toward a light beam splitter. The splitter separates the light beams into a plurality of beams that are focused in a crossing and focusing area. Receiving optics aligned with a photodetector sense light scattered by particles moving in the focusing area. The photodetector converts the light signals to electrical signals. A signal mixer coupled to the photodetectors operates to produce a difference electrical signal established by the difference between the frequencies of the electrical signals produced by the photodetector. The difference electrical signal is converted with signal processors to a voltage proportional to the velocity of particles moving through the focusing area. In one form, the signal mixer operates to produce a difference signal and a sum signal. The difference signal is received by a first signal processor to convert the difference signals to a voltage proportional to velocity $u_y$ of particles moving through the focusing area. A second signal processor receives a sum signal and converts the sum signal to a voltage proportional to the velocity $u_x$ of particles moving through the focusing area.

34 Claims, 5 Drawing Figures

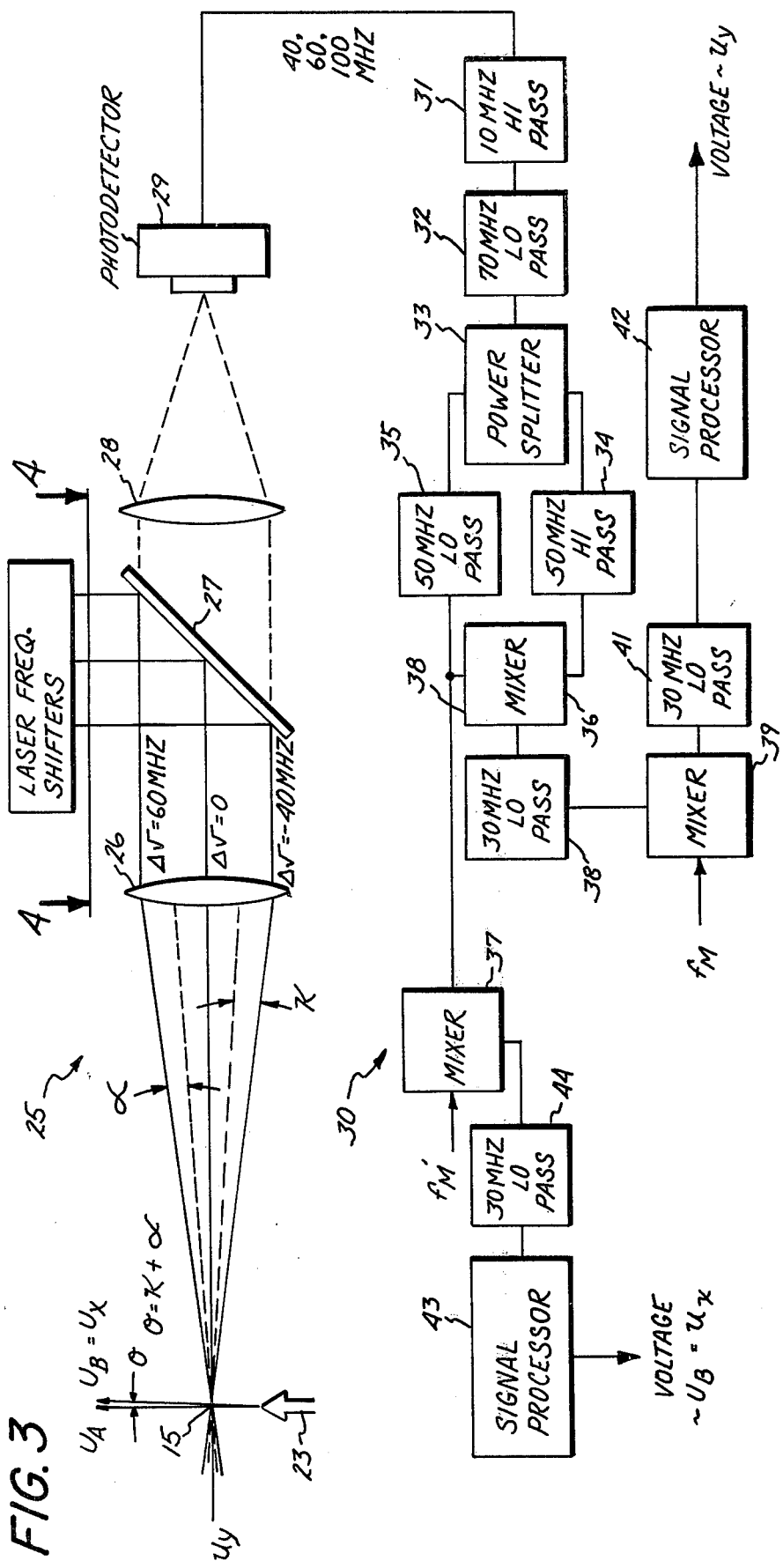

DIFFERENTIAL DOPPLER TECHNIQUE FOR ON-AXIS BACKSCATTER MEASUREMENTS

SUMMARY OF THE INVENTION

A nonintrusive diagnostic means for measuring motion of flowing solid or fluid particles. The measurement technique of detecting the Doppler shift of light scattered from a moving particle is used to measure motion of the particle. Since the Doppler shift of the light is very small when compared with light frequencies, Doppler techniques generally mix or "heterodyne" the Doppler shifted light with a reference beam. In the Differential Doppler (dual beam) technique, light scattered from two beams at different angles to the flow is heterodyned on a photodetector surface. The difference between the two Doppler shifted frequencies is then a frequency proportional to the flow velocity. The direction of measurement is in the plane of the two beams and perpendicular to a line midway between them, i.e., the measurement is perpendicular to the optical axis, as shown in FIG. 1.

The invention is directed to an apparatus and method that utilizes the dual beam mode to make measurements parallel to the optical axis. In many measurements, it is important to get all three components of the flow simultaneously. In addition, it is very desirable to collect the scattered light back through the same optical system used for transmitting the light (on-axis backscatter) or, at a minimum, with all optics on one side of the test section. The invention accomplishes these objectives while maintaining the inherent advantage of the Differential Doppler or Dual Beam mode of operation.

IN THE DRAWINGS

FIG. 3 is a diagrammatic view of an on-axis backscatter system using frequency shifts of $-40$ MHz, 0, and 60 MHz;

FIG. 4 is a top plan view viewing along line 4—4 in the direction of the arrows of FIG. 3.

Figure 1:
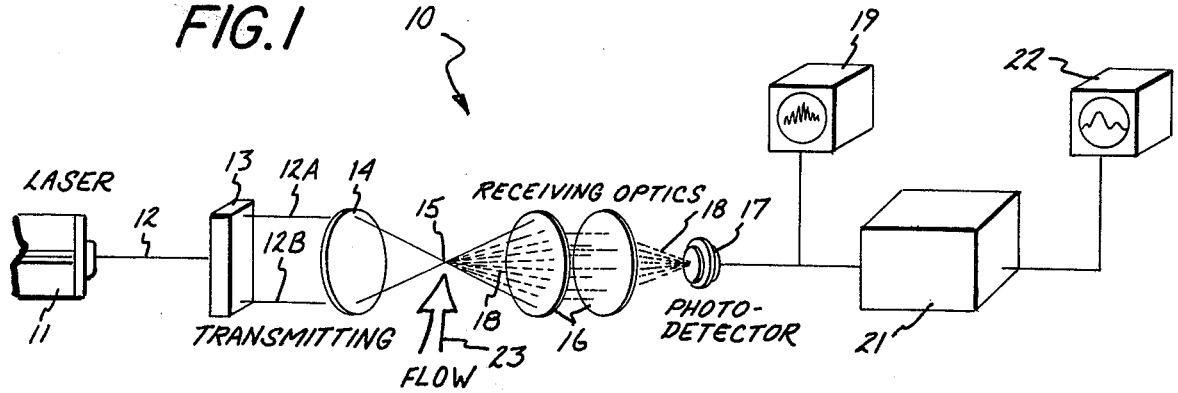
FIG. 1 is a diagrammatic view of a standard Differential Doppler system.

DESCRIPTION OF STANDARD DUAL BEAM SYSTEM;

Referring to FIG. 1, there is shown a diagram of a standard differential Doppler system indicated generally at 10. System 10 has a laser 11 generating a light beam 12 directed toward a beam splitter 13 operable to separate the light beam into two beams 12A and 12B. A focusing lens 14 associated with beam splitter 13 directs and focuses light beams 12A and 12B to measuring volume 15 located at the beam crossing and focusing areas. Receiving optics 16 are aligned with a photodetector 17 to receive scattered light 18 from scattering centers in measuring volume 15. Photodetector 17 converts light signals to electrical signals. A first oscilloscope 19 is used to provide a trace of the output of photodetector 17. A signal processor 21 connected to photodetector 17 converts frequency to a voltage. A second oscilloscope 22 operates to provide a trace of fluid velocity versus time. The flow 23 of solid or fluid particles is perpendicular to the line midway between the plane of the two light beams emanating from focusing lens 14. In the area where light beams 12A and 12B cross, measuring volume 15, the light wave fronts interfere with each other to form alternate regions of high light intensity and low light intensity, or light fingers. As a scattering center or particle passes through the crossing and focusing area, the variations in incident light cause variation in the intensity of the light scattered. When the scattered light is picked up by photodetector 17, it is converted to an electrical signal whose frequency is proportional to the rate at which the scatterer is crossing the interference fringes. The signal from photodetector 17 directed to oscilloscope 19 provides a visual observation of the signal. The conversion factor from frequency to velocity involves only the distance between fringes. This, in turn, depends only on the wave lengths of the light and the intersection angle of the two beams.

Measured velocity is the one perpendicular to the fringes. By rotating the plane of two beams 12A and 12B, both directions perpendicular to the optical axis can be measured. In the dual beam system the scattered light frequency is independent of the direction of observation. This makes it possible to have all the optics on one side of the test section (backscatter) with all of the incident and scattered light going through only one combination focusing and collecting lens. Even if more than one lens is used, it is convenient to have all components on one side of the measuring volume.

ON-AXIS COMPONENT

To measure the on-axis component or component of light frequency along the optical axis directly, the "fringes" must be orientated perpendicular to the optical axis. To do this on FIG. 1 would require that one beam come from the left, while the other comes from the right. This is very inconvenient and in many large systems it would be impossible to keep the beams crossed.

Another alternative is to have a second system at right angles to the first system. The optical axes of the first and second system would be perpendicular to each other. The measuring direction of the second system can be set so it measures in the direction of the optical axis of the first system. This is inconvenient for traversing because it is difficult to keep the measuring volumes coincident.

Hereinafter a method of obtaining the on-axis component using two systems from the same side of the measuring volume (backscatter) but with an angle, 0, between them is set out. The method includes the use of a mixer to take the difference signal before converting the frequency signal to a voltage proportional to velocity.

BACKSCATTER SYSTEM (All Optics On One Side of Measuring Volume)

Figure 2:
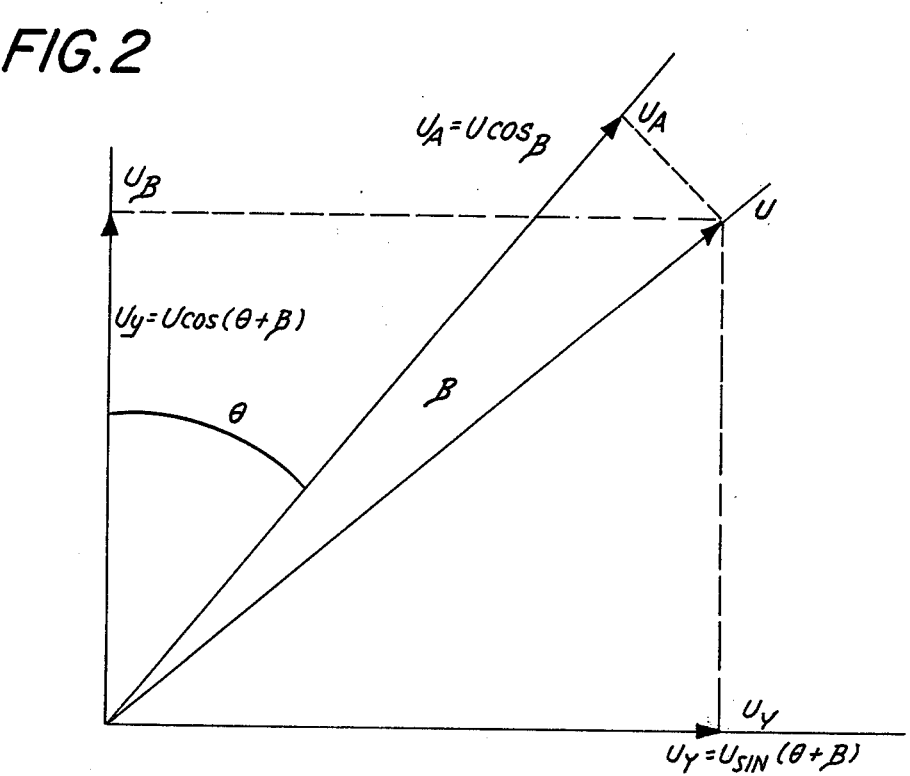
FIG. 2 is a graph for deriving $u_y$ from measured values $U_A$ and $U_B$ (two measurements at different angles)

One method of making an on-axis measurement is to make two measurements ($U_A$ and $U_B$) at different angles as shown in FIG. 2. To calculate $u_y$ with velocity measurements in directions $U_B$ and $U_A$:

$$U_B = u \cos(\theta + B) = u \cos\theta \cos B - u \sin\theta \sin B \quad (1)$$

$$u_y = u \sin(\theta + B) = u \sin\theta \cos B + u \cos\theta \sin B \quad (2)$$

$$U_A = u \cos B \quad (3)$$

From (1) and (3)

$$u \sin B = \frac{-U_B + U_A \cos \theta}{\sin \theta} \quad (4)$$

From (2), (3) and (4)

$$u_y = U_A \sin \theta - \frac{U_B - U_A \cos \theta}{\sin \theta} \cos \theta \quad (5)$$

Therefore, $u_y$ (the on-axis component) can be derived from the measured velocities $U_A$ and $U_B$.

If one now reduces the angle, $\theta$, sufficiently then the directions $U_A$ and $U_B$ could be measured through one lens. The problem is that $U_A$ and $U_B$ must be measured very accurately when $\theta$ is small. For small angles, $\sin \theta \approx 0$ and $\cos \theta \approx 1$ so Eq. (5) can be written:

$$u_y = \frac{U_B - U_A}{\sin \theta} \quad (6)$$

With $\theta$ small, $U_B - U_A$ will be the difference between two large numbers. For example, if $\theta = 4°$, $U_B = 106$, $U_A = 100$, then if $U_B$ and $U_A$ are measured within $\pm 1$ percent $$u_y = \frac{(106 \pm 1) - (100 \pm 1)}{0.07} = \frac{6 \pm 2}{0.07} = 86 \pm 29$$

Therefore, the error on $u_y$ is large even when the value approaches that of $U_A$ and $U_B$. For small values of $u_y$ it would be meaningless.

However, if $U_B - U_A$ could be measured directly, then this large error could be avoided. Since $U_A$ and $U_B$ are initially represented by frequencies, the method of doing this is to use a mixer to take the difference frequency. In a double balanced mixer, both the sum and the difference frequencies will be present but the sum can be filtered to give the difference only. In a single sideband mixer, only the difference frequency remains.

Re-writing the previous equations in terms of frequencies:

$$U_A = d_{fA} f_A$$

$$U_B = d_{fB} f_B$$

From Eq. (5)

$$u_y = d_{fA} f_A \sin \theta - \frac{(d_{fB} f_B - d_{fA} f_A \cos \theta)}{\sin \theta} \cos \theta \quad (7)$$

Rearranging:

$$\frac{u_y \sin \theta}{d_{fA}} = (f_A - f_B) + f_B \left(1 - \frac{d_{fB}}{d_{fA}} \cos \theta\right) \quad (8)$$

The dominant term in Eq. 8 is $f_A - f_B$, so obtaining this directly with a mixer will give the appropriate result for calculating $u_y$.

To utilize Eq. 8, $f_A$ and $f_B$ must be obtained independently from light scattered from overlapping measuring volumes. In order to measure one or more vector components with a differential doppler measurement instrument, there must be tagging of scattered light. Tagging methods include the use of frequency shifting to separate components by frequency, the use of two colors, and the use of light polarization. In frequency shifting, one establishes moving fringes by shifting the frequency of one of the two incident light beams. If the shift is 40 MHz, then a stationary scatterer in the measuring volume will give a frequency of 40 MHz from the photodetector. By using two different frequency shifts, the signals can be identified by their frequency as long as the Doppler shift due to velocity is small enough so there are no regions of overlapping frequencies for the complete range of fluid velocities.

In the two color method, two separate laser light frequencies (colors) are used. Using color selective components, one can separate out the scattered light signals. Similarly, polarization sensitive components are used to separate the scattered light when mutually perpendicular polarizations are used for the incident light beams of the two measuring directions.

ON-AXIS MEASUREMENT SYSTEM USING FREQUENCY SHIFTING TO SEPARATE COMPONENTS

Referring to FIGS. 3 and 4, there is shown an on-axis backscatterer system 25 using frequency shifts of $-40$ MHz, 0, and 60 MHz. One focusing and collecting lens 26 and mirror 27 is shown for a direct backscatter measurement. Lens 28 focuses the scattered light onto photodetector 29. At 0 velocity, the frequency outputs from photodetector 29 would be $-40$ MHz, 60 MHz, and 100 MHz. The flow 23 would add or subtract from these figures, depending on direction, but must contribute less than around 7 MHz to pass the filter means indicated generally at 30. The frequencies around 0 and 100 MHz are removed with a 70 MHz low pass filter 32 and 10 MHz high pass filter 31. A power splitter 33 then separate the signal with half going to a 50 MHz high pass filter 34 which removes component around 40 MHz and half going to a 50 MHz low pass filter 35 which removes component around 60 MHz. Subsequent mixing of these signals in mixer 36 leaves a difference frequency around 20 MHz. Filter 38, downmixer 39, and filter 41 prepares signal for processor 42. Downmixer 37, filter 44, and signal processor 43 measure $U_B$ directly.

Once the frequency represented $[20 - f_M + (f_A - f_B)]$ is measured, $f_A - f_B$ can be calculated since $f_M$ is known. Using equation 8, $u_y$ can now be calculated.

In the configuration of FIG. 3, $U_B$ is measured directly. In addition, the value of $(f_A - f_B)$ can be made proportional to $u_y$ if:

$$\frac{d_{fB}}{d_{fA}} \cos \theta = 1$$

Since in FIG. 3 one beam is common:

$$\theta = \kappa + \alpha$$

From the laser Eq.:

$$\frac{d_{fA}}{d_{fB}} = \frac{\lambda 2 (\sin \kappa)}{2 (\sin \alpha) \lambda} = \frac{\sin \kappa}{\sin (\theta - \kappa)} = \cos \theta$$

Rearranging using identities:

$$\sin 2\theta = \tan \kappa (3 + \cos 2\theta)$$

For small angles, assuming $\kappa \approx \alpha$ gives:

$$\cos 2\theta \approx \cos 4\kappa$$

Therefore:

$$\alpha = \tfrac{1}{2} \sin^{-1}[(\tan \kappa)(3+\cos 4\kappa)] - \kappa$$

This is useful to set the angle, $\alpha$, to this value so that $(f_A - f_B)$ is directly proportional to $u_y$.

When the maximum frequency range permits, the frequency shift technique is perhaps most cost effective. This is true since normally at least two frequency shifters are required to handle flow reversals. Even when different wave lengths (colors) are used, frequency shifting is normally required—both for flow reversals and to be sure there are enough "fringes" or cycles after downmixing.

ON-AXIS SYSTEM USING TWO COLORS

Figure 5:
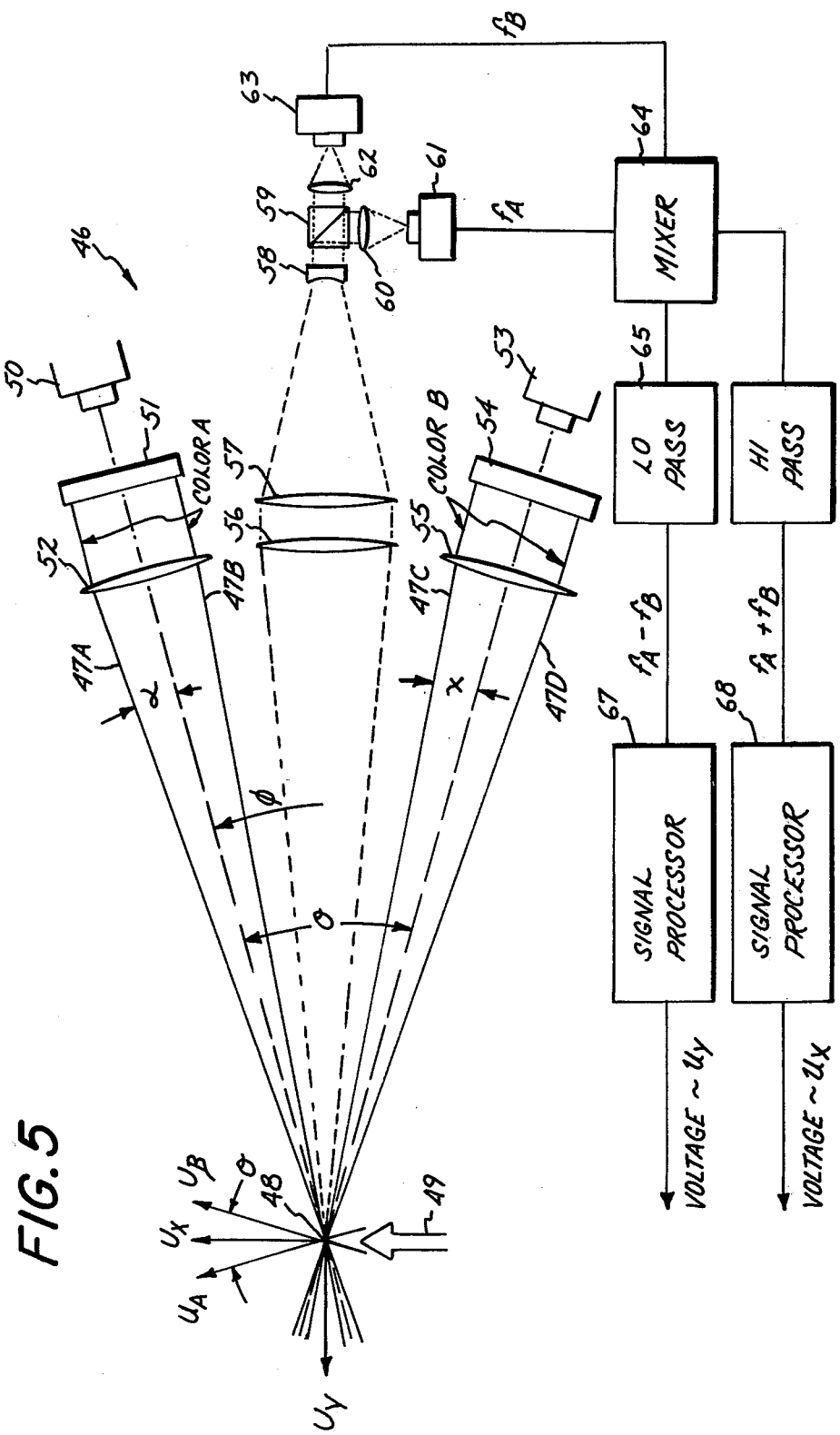
FIG. 5 is a diagrammatic view of a backscatter system using color separation.

FIG. 5 shows a two color system 46 using four light beams 47A, 47B, 47C, and 47D. Light beams 47A–47D have an intersection point 48. The flow 49 of particles moves through point 48. System 46 has a first laser 50 associated with a beam splitter 51 and laser beam focusing first lens 52 for color A, a second laser 53 associated with a beam splitter 54 and lens 55 for color B, scattered light collecting third lens 56, and a scattered light focusing fourth lens 57. Negative lens 58 collimates the scattered light for color splitter 49 where color A is reflected and color B is transmitted. Lens 60 focuses color A on photodetector 61 which converts the variations in scattered light flux into variations in electrical current to give frequency $f_A$. Lens 62 focuses color B on photodetector 63 to generate frequency $f_B$.

Frequency signals $f_A$ and $f_B$ are directed to mixer 64 and subsequent filter 65 gives the difference frequency $f_A - f_B$. A second filter 66 is used to give the sum frequency $f_A + f_B$. Difference frequency signal $f_A - f_B$ from filter 65 is directed to a signal processor 67 which has an output voltage proportional to $u_y$. Sum frequency signal $f_A + f_B$ from filter 66 is directed to a signal processor 68 which has an output voltage proportional to $u_x$.

As shown in the following, if $2\phi = \theta$ and if $\alpha$ and $\kappa$ are related to give the same calibration, then $$u_y \approx f_A - f_B$$

$$u_x \approx f_A + f_B$$

which are the results desired.
Since $$d_{fA} = \frac{\lambda_A}{2 \sin \alpha}$$

$$d_{fB} = \frac{\lambda_B}{2 \sin \kappa}$$

For equal fringe spacing ($d_{fA} = d_{fB}$):

$$\frac{\lambda_A}{\sin \alpha} = \frac{\lambda_B}{\sin \kappa}$$

As an example, if $\lambda_A = 514.5$ nm, $\lambda_B = 488$ nm, and $\alpha = 3°$ then:

$$\kappa = \sin^{-1}\left(\frac{488}{514.5} \sin \alpha\right) = 2.85°$$

This is a reasonable angle difference, where the selected wave lengths are common ones from an Argon ion laser. With the above set-up, the output of signal processor 64 is a voltage proportional to $u_y$ and the output of signal processor 65 is a voltage proportional to $u_x$.

FIGS. 3 and 5 show only two possible configurations out of an almost unlimited number of possibilities. For example, polarization can be used rather than two colors (FIG. 5) or frequency separation (FIG. 3). One lens, as in FIG. 3, two lenses, or three lenses as in FIG. 5 can be used with any system for separating signals.

In the systems shown in FIGS. 3 and 5, an essential feature is mixing frequencies to get $(f_A - f_B)$. With only a short burst of frequencies as in LDA, any measurement has a finite accuracy associated with it—even if the signal is "clean". By mixing, little accuracy is lost in getting a frequency out equal to $(f_A - f_B)$. This frequency is now measured with as much accuracy as available for the noise present and the signal processor used.

In summation, the apparatus of the invention measures the motion of a flowing solid or fluid particles through the light beam crossing and focusing area 15 in FIG. 3 and area 48 in FIG. 5. The laser beam generates a light beam which is split by a beam splitter, as beam splitter 13, into two or more separate light beams. A lens system, as lens 14, functions to focus the separate light beams in the crossing and focusing area 15. The flow of particles, solid or fluid, is directed by a suitable apparatus through the crossing and focusing area. The particles flowing through the focusing area scatter some light of the separate light beams. The scattered light has separate frequencies, depending on the motion of the particles moving through focus area 15. Photodetector means 29 in FIG. 3, and 61 and 63 in FIG. 5, function to sense the scattered light. The photodetector means converts the sensed scattered light into electric signals whose frequencies are proportional to the rate at which the particles scatter the light. In other words, each light beam has its own frequency which is sensed by the photodetector means.

The output electric signals from the photodetector means are mixed to provide, in the system in FIG. 3, a difference electric signal established by the difference between the frequencies of the mixed electric signals. The difference signal is converted to a voltage proportional to velocity of the particles moving through the focusing area with the signal processor. In the system shown in FIG. 5, the scattered light is split into two segments according to the color of the light. Two photodetectors 51 and 63 are used to sense the separate scattered light and convert the sensed scattered light into separate electrical signals whose frequencies are proportional to the rate at which the particles scatter the light. The signals from both of the detectors are mixed in a mixer 64 to provide a difference electric signal established by the difference between the frequencies of the mixed electrical signals and a sum electrical signal established by the sum of frequencies of the mixed electrical signals. The difference and sum electrical signals are fed into separate signal processors 67 and 68. These signal processors convert the difference signal and sum signal into separate voltages that are proportional to velocities $u_y$ and $u_x$ of the particles moving through said focusing area 48.

While there has been shown and described several preferred embodiments of the invention and methods of measuring motion of a flowing solid or fluid particles, it is understood that changes in the structure, components, and electrical circuits may be made by those skilled in the art without departing from the invention. The invention is defined in the following claims.

The embodiments of the invention in which an exclusive property or privilege is claimed are defined as follows:

1. A method of measuring the velocity component of flowing solid or fluid particles along the axis of an optical system comprising: generating a light beam, splitting the light beam into a plurality of separate light beams to provide at least two identifiable scattered light signals, directing the separate light beams to a crossing and focus area, moving particles through said crossing and focusing area whereby said particles produce scattered light, sensing the scattered light, converting the sensed scattered light into two electric signals whose frequencies are proportional to two different vector components of the velocity at which the particles move through the focusing area of the separate light beams, mixing the electric signals to provide a frequency equal to the difference between the frequencies of said two electric signals, said difference frequency being proportional to the velocity component of the particles along the optical axis of the optical system, and converting the difference frequency to a voltage proportional to the velocity component along the optical axis of the optical system of the particles moving through said focusing area.

2. The method of claim 1 wherein: the light beam is split into three coplanar parallel light beams.

3. The method of claim 2 including: shifting the frequency in different amounts of two of said three light beams.

4. The method of claim 1 wherein: the scattered light is sensed with a photodetector, said photodetector being operable to convert the sensed scattered light into electrical signals.

5. The method of claim 1 wherein: said light beam is split into three coplanar parallel light beams, shifting the frequency of two of the three light beams in different amounts, and crossing and focusing said light beams at a point where the measurement is to be made.

6. The method of claim 1 wherein: each light beam is split into three or more separate light beams.

7. The method of claim 1 wherein: all of said split light beams are directed to a crossing and focusing area where the measurement is to be made.

8. The method of claim 1 including: shifting the frequency in different amounts of two of three of said light beams, and separating the signals representing the two vector components with a power splitter and filter means.

9. The method of claim 1 wherein: the scattered light is sensed with a photodetector, said photodetector being operable to convert the sensed scattered light into electrical signals, said signals representing the two vector components being mixed and filtered to provide a difference frequency proportional to the vector along the optical axis.

10. The method of claim 9 wherein: the separately sensed scattered light is converted into separate electric signals whose frequencies are proportional to the rate at which the particles scatter the separate light beams.

11. The method of claim 10 wherein: the separate electric signals are mixed to provide a difference electrical signal established by the difference between the frequencies of the separate mixed electric signals and a sum electric signal established by the sum of frequencies of the mixed electric signals and converting the difference signal to a voltage proportional to the particles moving through said focusing area and converting the sum signal to a voltage proportional to velocity of the particles moving through said focusing area.

12. A method of measuring the velocity component of flowing solid or fluid particles along the axis of an optical system comprising: generating a light beam, splitting the light beam into a plurality of separate light beams to provide at least two identifiable scattered light signals, directing the separate light beams to a crossing and focus area, moving particles through said crossing and focus area whereby said particles produce scattered light, sensing the scattered light, converting the sensed scattered light into two electric signals whose frequencies are proportional to two different vector components of the velocity at which the particles move through the focusing area of the separate light beams at which the particles move through the focusing area of the separate light beams, mixing the electric signals to provide a frequency equal to the difference between the frequencies of the mixed electric signals and a sum electric signal established by the sum of the frequencies of the mixed electric signals, said difference electrical signals being proportional to the velocity component of particles along the optical axis of the optical system, converting the difference signal to a first voltage proportional to velocity $u_y$ of the particles moving through said focusing area, and converting the sum signal to a second voltage proportional to velocity $u_x$ of the particles moving through said focusing area.

13. The method of claim 12 wherein: the light beam is split into three or more separate light beams.

14. The method of claim 12 wherein: said light beam being split into three coplanar parallel beams, shifting the frequency in different amounts of two of said three light beams.

15. The method of claim 12 wherein: the scattered light is sensed with a photodetector, said photodetector being operable to convert the sensed scattered light into electrical signals.

16. The method of claim 12 wherein: said light beam is split into three coplanar parallel beams, said light beams being crossed and focused at a point where the measurement is to be made.

17. The method of claim 16 including: shifting the frequency in different amounts of two of said light beams.

18. The method of claim 12 wherein: said signals representing two vector components are separated with splitter means and filter means.

19. The method of claim 12 wherein: the scattered light is sensed with a photodetector, said photodetector being operable to convert the sensed scattered light into electrical signals, said signals representing the two vector components being mixed and filtered to provide a difference frequency proportional to the velocity vector along the said optical axis.

20. An apparatus for measuring the velocity component of flowing solid or fluid particles along the axis of an optical system comprising: laser means for generating a light beam, means for splitting the light beam into separate light beams, means operable to focus the separate light beams in a crossing and focusing area, means for directing a flow of particles through said focusing area, said particles flowing through said focusing area producing scattered light of each light beam, photodetector means, means for directing the scattered light to said photodetector means whereby the photodetector means produces electric signals whose frequencies are proportional to two different vector components of the velocity at which the particles move through the focusing area, means connected to the photodetector means to take said electric signals and produce a frequency equal to the difference between the frequencies of said electric signals, said difference frequency being proportional to the velocity component of particles moving along the optical axis, and means using the difference frequency to convert the difference frequency to a voltage proportional to velocity of the particles moving along the optical axis.

21. The apparatus of claim 20, wherein: the means connected to the photodetector means is a mixer operable to produce said difference frequency, and including a signal processor connected to the mixer to receive the difference frequency and convert said difference frequency to a voltage proportional to the velocity of the particles moving along the optical axis.

22. The apparatus of claim 20 wherein: the means connected to the photodetector means is a mixer operable to produce a difference frequency and a sum frequency established by the sum of the frequencies of said electrical signals, and a first signal processor connected to the mixer to receive the difference frequency and convert said difference frequency to a voltage proportional to velocity $u_y$ of particles along the optical axis moving through said focusing area and a second signal processor connected to the mixer to receive the sum frequency and convert said sum frequency to a voltage proportional to a velocity $u_x$ of particles moving through said focusing area.

23. The apparatus of claim 22 including: a low pass filter connected to the mixer and first signal processor and a high pass filter connected to the mixer and second signal processor.

24. The apparatus of claim 20 wherein: said means connected to the photodetector means includes a high pass filter, a low pass filter connected to the high pass filter, a power splitter connected to the low pass filter, a first mixer connected to the power splitter, said first mixer having a first output signal and a second output signal, a second mixer connected to the first mixer for receiving the first output signal, a first signal processor receiving the output signal from the second mixer, said signal processor converting said output signal to a voltage proportional to the velocity component of particles along the optical axis moving through said focusing area, a third mixer receiving the second output signal from the first mixer, and a second signal processor connected to the third mixer for receiving a signal therefrom and converting said signal to a voltage proportional to a velocity component of particles along the optical axis moving through said focusing area.

25. The apparatus of claim 24 including: a low pass filter connected to the power splitter and the first mixer and a high pass filter connected to the power splitter and first mixer.

26. The apparatus of claim 24 including: a low pass filter connected between the first mixer and second mixer.

27. The apparatus of claim 24 including: a first low pass filter connected between the second mixer and first signal processor, and a second low pass filter connected between the third mixer and second signal processor.

28. The apparatus of claim 20 wherein: said laser means includes a first laser generating a first light beam having a first color, and a second laser generating a second light beam having a second color, said first and second light beams being focused in said crossing and focusing area.

29. The apparatus of claim 28 wherein: the photodetector means includes a first photodetector and a second photodetector, said means for directing the scattered light including means for directing scattered light from the first light beam to one detector and means for directing scattered light from the second light beam to the other detector, said detectors producing electric signals whose frequencies are proportional to the rate at which the particles scatter the first and second light beams.

30. A method of measuring the velocity component of flowing solid or fluid particles along the axis of an optical system comprising: generating a light beam, splitting the light beam into four coplanar parallel light beams to provide at least two identifiable scattered light signals, directing the separate light beams to a crossing and focusing area, moving particles through said crossing and focusing area whereby said particles produce scattered light, sensing the scattered light, converting the sensed scattered light into separate electrical signals whose frequencies are proportional to at least two different vector components of the velocity at which the particles move through the focusing area of separate light beams, mixing the electrical signals to provide a frequency equal to the difference between the frequencies of said separate electrical signals, said difference frequency being proportional to the velocity component of the particles along the optical axis of the optical system, and converting the difference frequency to a voltage proportional to the velocity component of the particles along the optical axis of the optical system moving through said focusing area.

31. The method of claim 30 wherein: said four light beams are two pairs of light beams, each pair of light beams being identifiable from the other pair of light beams.

32. The method of claim 31 wherein: the scattered light from each pair of light beams is separated and directed to separate photodetectors.

33. The method of claim 30 wherein: said light beams are crossed and focused at the point where the measurement is to be made.

34. The method of claim 30 wherein: the electrical signals from the separate photodetectors are subtracted providing a resulting difference frequency which is proportional to the velocity component of the particles along the optical axis of the optical system.

* * * * *